Figure 1:
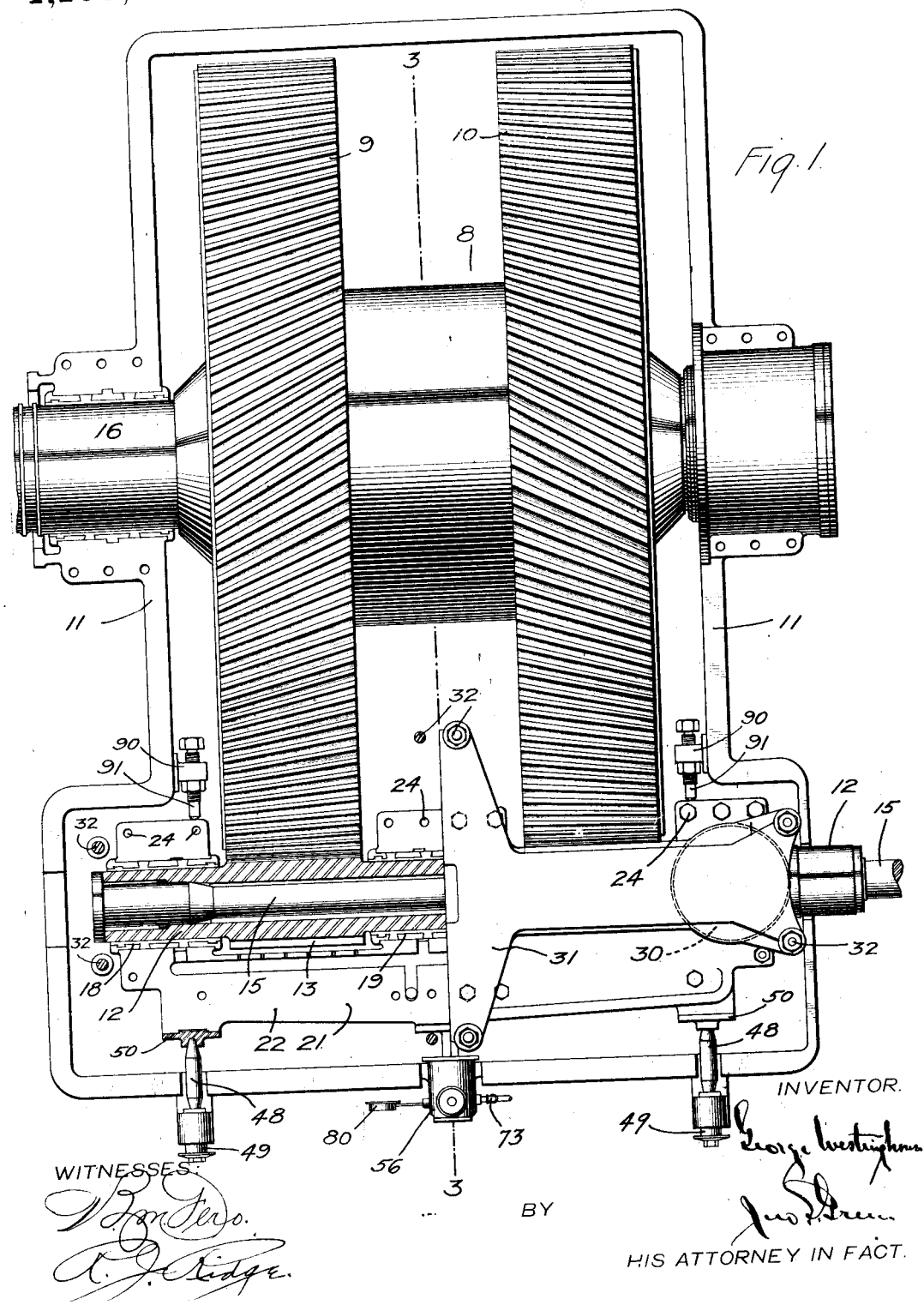

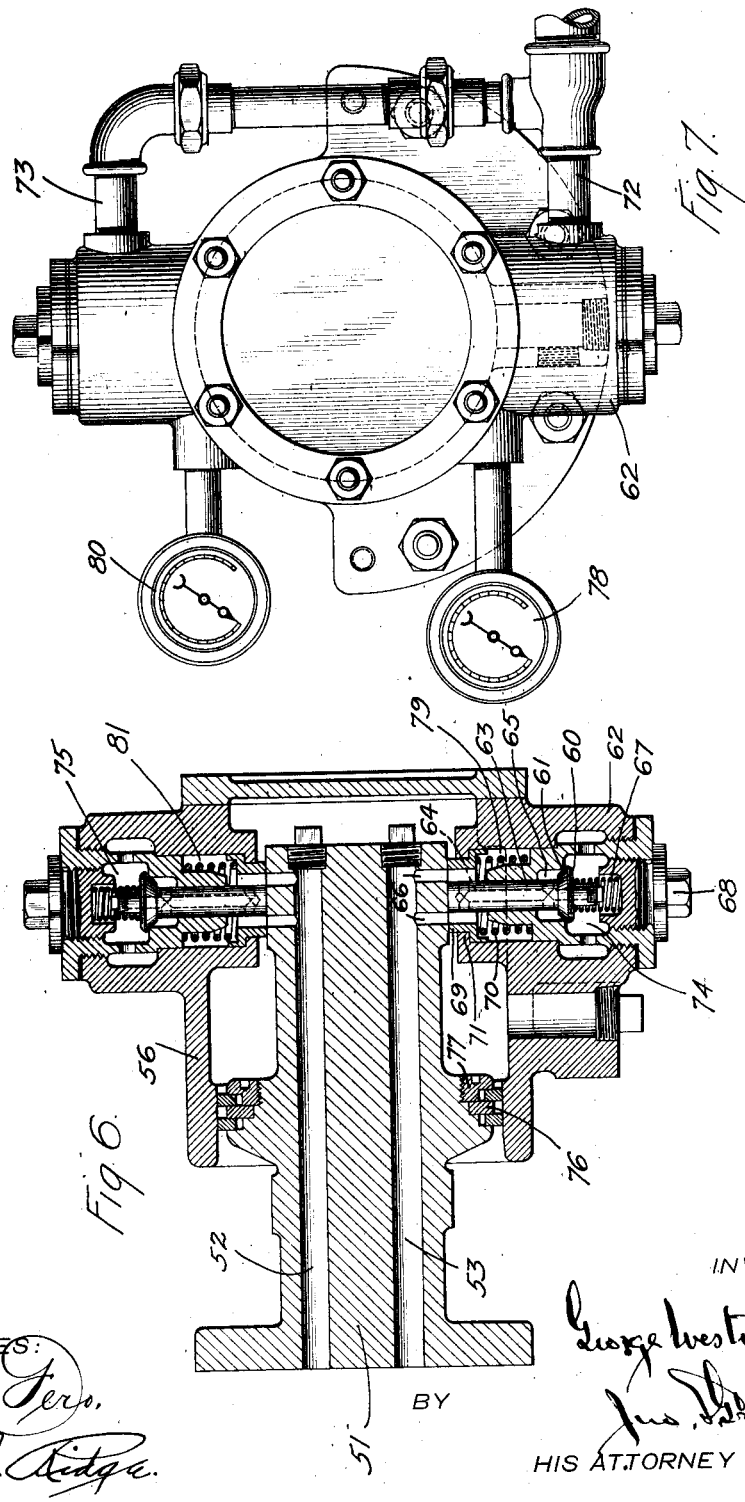

UNITED STATES PATENT OFFICE.

GEORGE WESTINGHOUSE, OF PITTSBURGH, PENNSYLVANIA, ASSIGNOR TO THE WESTINGHOUSE GEAR AND DYNAMOMETER COMPANY, A CORPORATION OF PENNSYLVANIA.

REDUCTION-GEARING.

1,195,119.       Specification of Letters Patent.   Patented Aug. 15, 1916.

Application filed June 16, 1911. Serial No. 633,458.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Reduction-Gearing, of which the following is a specification.

This invention relates to reduction gearing for transmitting power from high speed engines or motors to apparatus at lower speeds.

An object of this invention is to produce a reduction gearing equipped with means for automatically distributing and equalizing the pressure on the teeth of the gears employed.

A further object is to produce a reduction gearing equipped with means for automatically counterbalancing, by fluid pressure, the resultant strains due to the tooth pressure between the intermeshing gears and for permitting relative angular motion between the intermeshing gears.

A further and more specific object is to produce an accurate and effective means for varying the counter-balancing fluid pressure in accordance with variations of the tooth pressure.

A still further and more specific object is to produce means for utilizing the bearings of one of the intermeshing gears for supplying the necessary counter-balancing fluid pressure.

There are many instances in which it is desired to reduce the speed from an efficient turbine or other high speed device to a device or apparatus designed to run most efficiently at relatively low speeds. Ships' propellers are examples of such slow speed devices, they operating most efficiently at relatively slow speeds. Consequently, in order to obtain the best efficiency when turbines (which operate most efficiently at relatively high speeds) are employed for marine propulsion, it is necessary to employ a reduction pulsion, it is necessary to employ a reduction gearing between the turbine and the propeller. To this end, I have provided a driving member which may be connected to the turbine shaft, and from which power may be delivered by the turbine to a more slowly revolving shaft by means of a pinion or pair of pinions journaled in a floating frame, and which intermesh with a gear or a pair of gear wheels. The floating frame carrying the pinion is supported on the base frame or bed of the gearing device, in such manner that it is free to assume different positions both in a horizontal and a vertical plane, for the purpose of adjusting the position of the pinion shaft relative to the shaft of the gear, thereby distributing the tooth pressures along the teeth and between the sets of teeth of the intermeshing gears of the reduction gearing.

For the purpose of illustration I have shown the device as consisting of a spur gearing including a gear and an intermeshing pinion in which the pinion is journaled in a fluid supported floating frame, which permits the pinion to assume different angular positions relative to the gear in response to variations of tooth pressures encountered, whereby such tooth pressures are automatically and proportionally distributed.

In the apparatus illustrated as one embodiment of my invention, the pinion is shown as having two sets of oppositely disposed spiral teeth, and the gear likewise has two corresponding sets of spiral teeth. The floating frame of the pinion is supported on fluid actuated pistons so arranged that the fluid pressure employed to counter-balance the tooth pressures between the intermeshing gears is automatically controlled, varying with the variations in the tooth pressure.

Further advantages, as well as novelty of construction will be specifically described hereinafter, it being understood that changes in form, proportion or minor details of construction may be resorted to without departing from the spirit of my invention.

Figure 2:
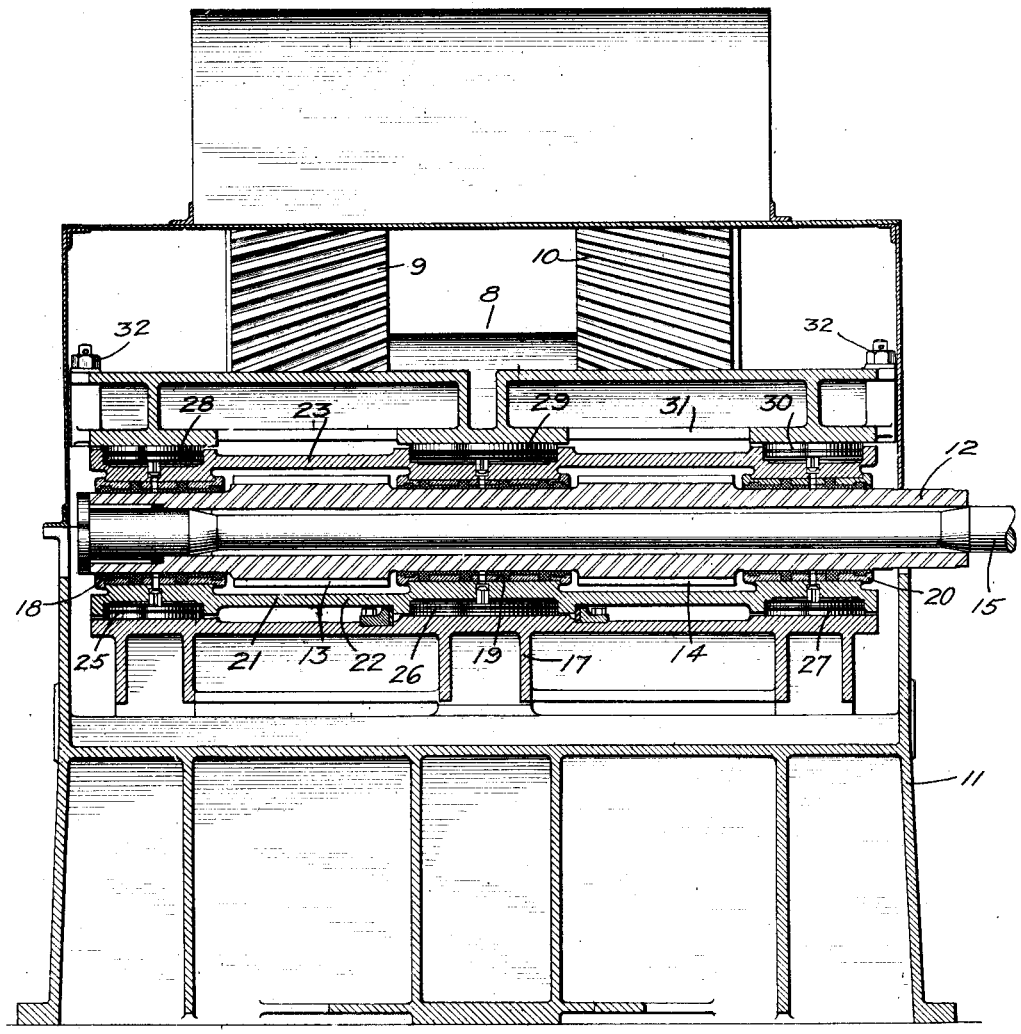
Figure 3:
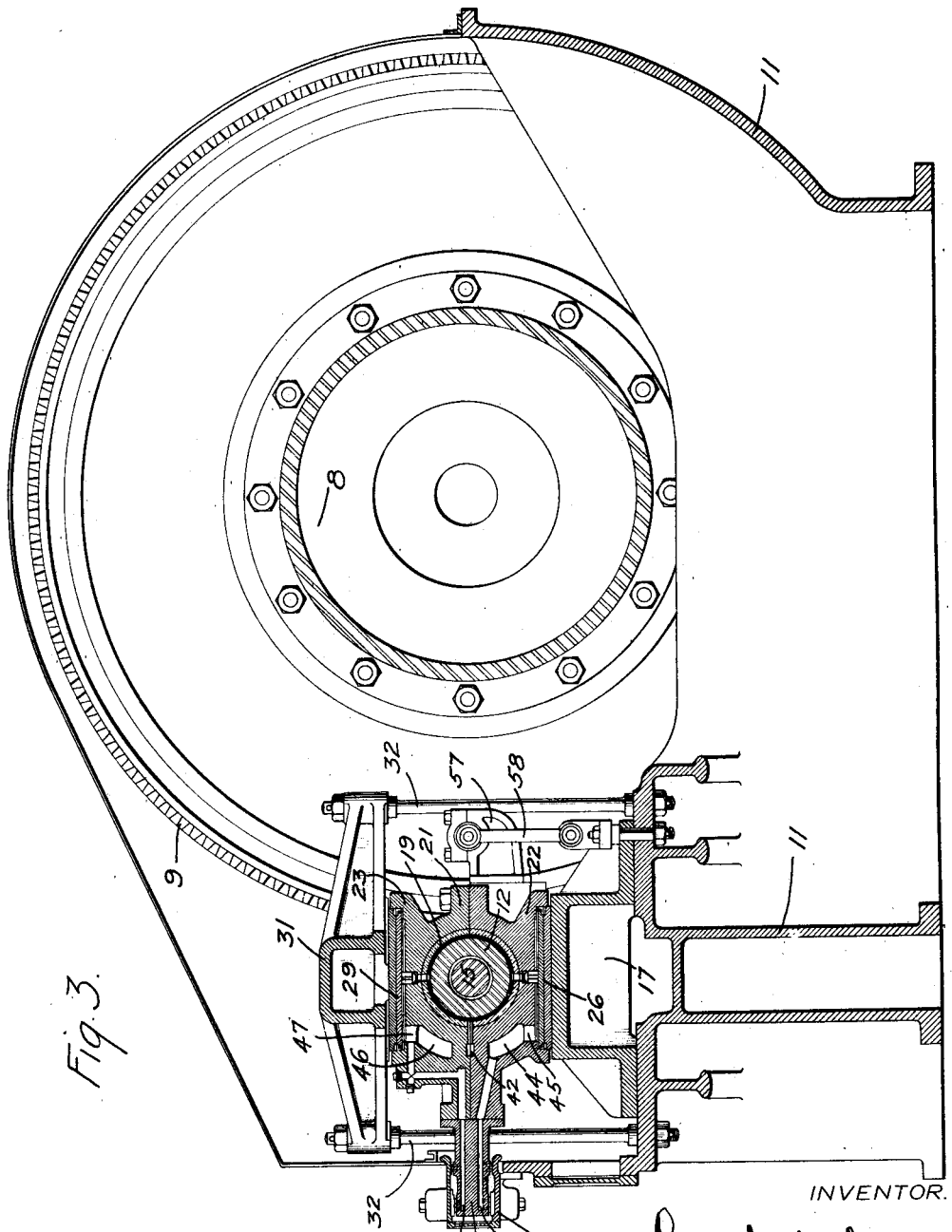
Figure 4:
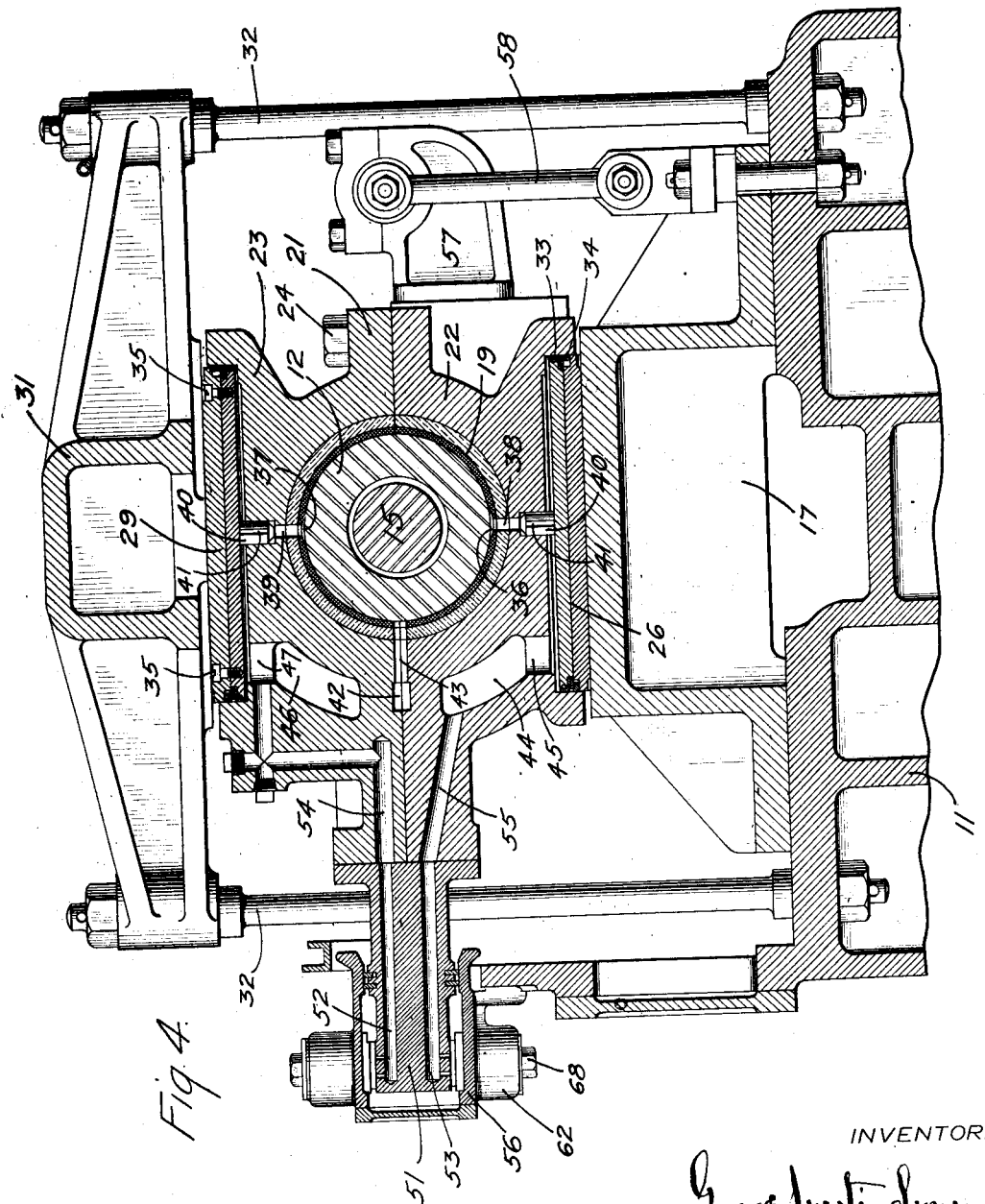
Figure 5:
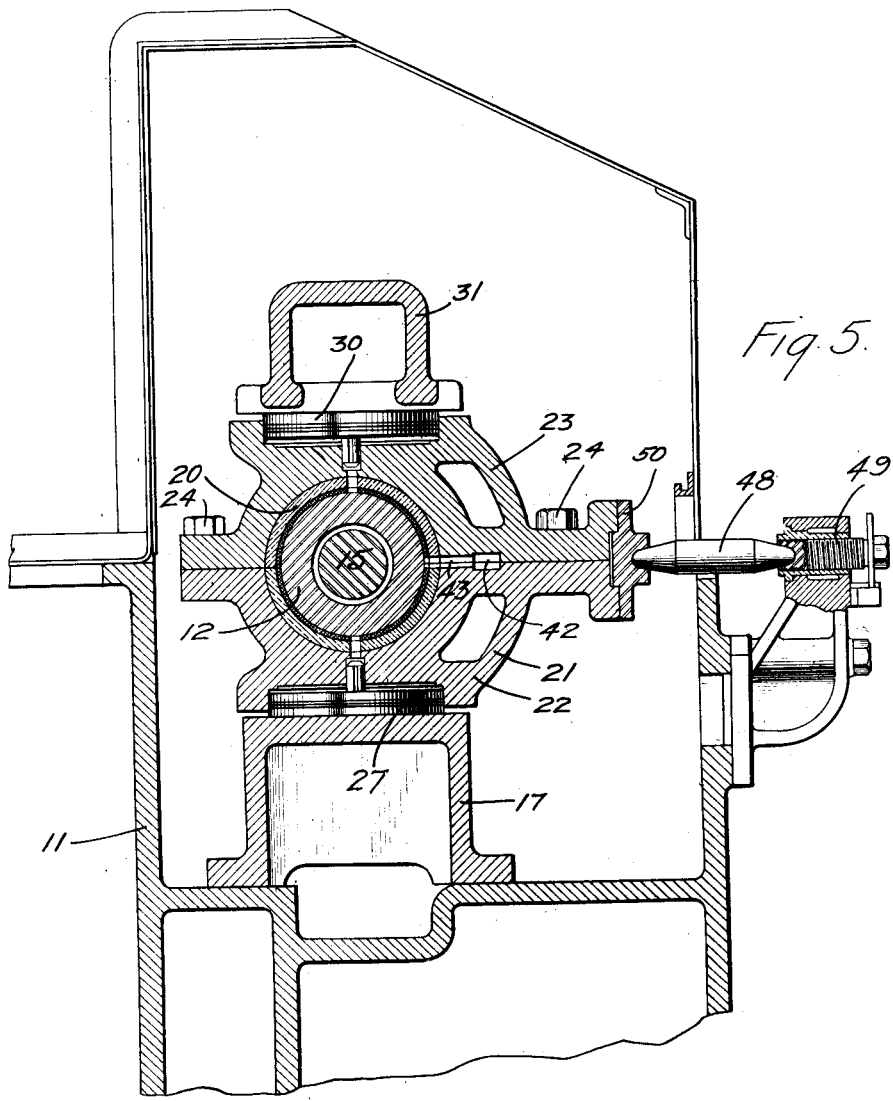

In the drawings accompanying this application and forming a part thereof and throughout which similar elements are denoted by like characters, Figure 1 is a plan view of a reduction gearing embodying this invention, a portion of the pinion being shown in section. Fig. 2 is a view partially in longitudinal section, and partially in elevation of the reduction gearing shown in Fig. 1. Fig. 3 is a view in cross-section taken on the line 3—3 in Fig. 1. Fig. 4 is an enlarged detailed view taken on the line 3—3 of Fig. 1. Fig. 5 is an enlarged detailed view of a portion of the device. Fig. 6 is a sectional view of a portion of the device and, Fig. 7 is an end elevational view in detail of the part illustrated in Fig. 6.

Referring to the drawings, a gear 8 having oppositely disposed spiral teeth 9 and 10 is journaled in a suitable frame or bed 11, and meshes with the pinion 12 having oppositely disposed spiral teeth 13 and 14. The pinion is mounted on a shaft 15, adapted to be directly coupled to a turbine shaft, and the gear is mounted on a shaft 16, adapted to be coupled to the apparatus such as a ship's propeller, to be driven at slower speeds. The base frame 11 carries a supporting frame 17. The pinion is journaled in bearings 18, 19 and 20, carried in a floating frame 21, preferably made up in two sections 22 and 23 bolted together as at 24, forming a rigid structure. The lower portion 22 of the floating frame is bored out to receive three pistons 25, 26 and 27, which rest on the top planed surface of supporting frame 17. The upper portion 23 of the floating frame is likewise bored out to receive pistons 28, 29 and 30, which bear against the lower planed surface of a retaining beam 31, bolted to the bed or frame 11 by means of bolts 32.

The pinion floating frame is supported, top and bottom, so that the reduction gearing can be operated in both directions. This is necessary in the case of marine propulsion for running the gearing for ahead and astern driving.

Each of the pistons is preferably provided with a cupped leather packing 33 and a split piston ring 34 to prevent excessive leakage. The pistons may be made in any suitable manner, but preferably are formed of two plates as illustrated in Fig. 4, screwed or otherwise secured together as at 35 for the ready insertion of the cupped leather and piston rings.

Each of the bearings for the pinion, which is preferably lined with bearing metal, such as babbitt, is longitudinally channeled or grooved at the top and bottom as at 36 and 37, and the bearings and frame are drilled at 38 and 39, so that the grooves 36 and 37 communicate with the cylinders on the inner sides of the pistons. In each of these drilled holes a plug valve 40 is located for controlling communication from the bearing to the interior of the piston cylinders. The plug valves are provided with seats in the floating frame and are longitudinally channeled at 41 to form oil grooves for the passage of oil from the bearings into the piston cylinders.

The bearings are supplied with oil under pressure from any suitable source which connects with a channel 42, formed in the upper and lower portions of the floating frame, and which extends longitudinally of the floating frame and connects with the bearings by means of openings or distributing channels 43.

It has been found that with the pistons of sufficient area, the pinion bearings will pump the oil supplied to them into the piston cylinders at an increased and sufficient pressure to float the frame and the pinion so as to counter-balance the resultant strains due to the tooth pressure between the intermeshing gears. The cylinders for the pistons 25, 26 and 27 are connected together by means of a channel 44, so that the pressures in all of the piston cylinders are substantially the same. Channel 44 and openings 45 leading from the piston cylinders to the channel must be of such size that a free flow of oil between the piston cylinders is assured, in order that when the tooth pressure at one end of the pinion is from some cause increased beyond the normal pressure, that end of the pinion may be pressed or moved away from the gear intermeshing therewith, and the oil below the piston at that end flows into the other piston cylinders, thereby equalizing the tooth pressures along the teeth of the pinion. From this, it will be seen that when the reduction gearing is operating in a direction so that the tooth pressures exert a downward strain on the pinion, the floating frame will actually float on the oil under pressure in the cylinders of pistons 25, 26 and 27, and the frame will be sensitive to take just the required position to automatically adjust and distribute the tooth pressures along the teeth of the pinion. When the reduction gearing is operating in the reverse direction, the oil under pressure in the cylinders of pistons 28, 29 and 30 will float the frame so that the tooth pressures encountered will be taken care of, and automatically and proportionally distributed. The cylinders for pistons 28, 29 and 30 are inter-connected by means of channel 46, formed in the upper portion 23 of the floating frame, and which connects with the several cylinders by means of passages 47.

In order to restrict the movement of the floating frame to movements in a plane including the axis of the pinion and perpendicular to the plane including the axes of the gear and pinion, adjustable struts 48 are utilized. These struts which are provided with micrometer adjustments 49 bear against blocks 50 secured to the floating frame.

In order to be certain of a sufficient amount of fluid under pressure, under automatic regulation for supplying the piston cylinders, I make use of a supplemental oil supply. This is utilized as a safe-guard in case, for any reason, the bearings should get out of alinement and fail to supply the piston cylinders with the necessary and proper amount of oil under pressure for floating the frame. A controlling arm 51, provided with oil channels 52 and 53 is bolted or otherwise secured to the floating frame which, at that point, is provided with channels 54 and 55, registering with channels 52 and 53 and communicating with channels 44 and 46 for supplying the piston cylinders. Surrounding this arm and carried by the casing of the main frame is a housing 56, shown in detail in Fig. 6, which carries valves operated by the movement of the arm for controlling automatically the admission of fluid under pressure to the piston cylinders and its escape therefrom.

Since the movements of the floating frame are limited to movements in the plane including the axis of the pinion and perpendicular to the plane including the axes of the gear and pinion, and since the movements under the severest loads which the reduction gearing will encounter are exceedingly small, (a few thousandths of an inch) it is not only desirable but necessary to amplify this movement for operating the valves just referred to, and this is accomplished by providing the floating frame with a rearwardly extending arm 57, and in connecting said arm to the base frame by means of a link 58. The arm 51 and said link are located opposite one another, and preferably at the center of the floating frame, where the movements are found to be the least. This link while allowing free movement of the frame throughout the restricted limits necessarily cause the frame to move about a point in the link which will amplify the movement of arm 51, giving to the outer end of arm 51, a movement of about an eighth of an inch, which is found to be sufficient to operate the controlling valves.

A valve 60 seating at 61 on a seat formed in a valve bonnet 62, is provided with a stem 63, which bears against the underside of arm 51. The stem 63 is drilled out so as to form channels 64, shown by dotted lines in Fig. 6 for the flow of oil from chamber 65, when the valve is open, through said chananels in the valve stem and through channels 66 leading through said controlling arm 51 into channel 53; which channel supplies and discharges oil from channel 44 which communicates with the three cylinders of pistons 25, 26 and 27. Valve 60 is seated by means of a spring 67, the tension of which may be adjusted by means of adjusting nut 68. A collar or bushing 69 which surrounds the stem of valve 60, is provided with channels which register with channels 66 and is held toward arm 51 by means of a coil spring 70, and is limited in outward movement by a stop shoulder 71. The construction and arrangement of the other valve device illustrated in Fig. 6, which controls the passage of fluid through channel 52 being exactly the same as the construction and arrangement just described, a description of this is deemed unnecessary. Oil under pressure from any suitable source such as an accumulator or pump is supplied through pipes 72 and 73 to valve chambers 74 and 75. It will thus be seen that when the controlling arm 51 moves up and down as the floating frame assumes different positions, the valves will be moved more or less from their seats and oil pressure from said source allowed to flow into the piston cylinders through channels 52, 53 and the channels connecting therewith.

Between the controlling arm 51 and the housing surrounding the outer end thereof, packing rings 76 are provided and are held in place by means of a lock nut 77. This will retard the flow of oil from the housing into the main casing of the reduction gearing and by thus damming up the oil, the necessary pressure within the housing can be maintained.

A pressure gage 78 connected to chamber 79 (which is in open communication at all times with the channel 53) indicates the pressure in channel 53, and therefore the pressure under the pistons 25, 26 and 27, while a pressure gage 80 connected to chamber 81, (which is in open communication with channel 52) indicates the pressure below pistons 28, 29 and 30.

Given the pressure in the piston cylinders and knowing the area of the pistons, the load on the reduction gearing in horse power may be derived by utilizing the following formula:

$$L = \text{load on teeth in lbs.} = \frac{H.P. \times 33000 \times 12}{\pi \times (\text{dia. of pinion in inches}) \times R.P.M. \text{ of pinion}}$$

But $L$ also $= \text{area of pistons} \times \text{oil pressure per sq. in.}$ $$\therefore H.P. = \frac{\text{area of pistons} \times \text{oil pressure} \times \pi \times \text{dia. of pinion in inches} \times R.P.M. \text{ of pinion}}{33000 \times 12}$$

In the device illustrated, the central pistons are shown of larger diameter than the end pistons. This, of course, is necessary in order to take care of the load on the central bearing, which is in excess of the load on the end bearing. The central bearing serving as a common support for the two portions of the pinion.

By providing stop shoulder 71 for sliding bushing 69, the outward movement of said bushing beyond said step is prevented and the movement of controlling arm 51 upward and therefore the movement of the pinion upward beyond a predetermined point is prevented as the oil pressure when said controlling arm 51 tends to move away or out of contact with said bushing 69 will diminish because the oil will flow into the housing surrounding arm 51, and the excess will be discharged past packing rings 76.

When the pinion is driven in a counter-clockwise direction, the tooth pressure between the intermeshing gear teeth will tend to force the floating frame downwardly, in opposition to the oil pressure in the cylinders below the frames, and if this downward resultant of the tooth pressure preponderates over the effect of the oil pressure in all of the cylinders, the floating frame will move down until controlling arm 51 moves out of contact with the upper tubular bushing, when the oil pressure in the upper piston cylinders will be relieved.

When the pinion is driven in a clock-wise direction, the tooth pressure between the intermeshing teeth will tend to force the floating frame upwardly in opposition to the pressure in the cylinders above the floating frame, and if this upward resultant of the tooth pressure preponderates over the effect of the oil pressure in the upper cylinders, the floating frame will move the upper pistons up until the controlling arm 51 moves out of contact with the tubular bushing 69, and the oil pressure in the cylinders below the floating frame is relieved.

If for any reason the tooth pressure at one portion of the gear tends to exceed that at another portion of the gear, the piston at that point would tend to support a greater load than the other pistons. This, of course, is impossible with the hydraulic system employed, since the pistons, instead of assuming different loads per square inch of area, will adjust themselves by varying their relative positions so as to distribute the load between them and impose an equal load per square inch of piston area on each of the pistons. In this manner the tooth pressures are automatically and proportionally distributed along the face of the teeth of the intermeshing gears. The same resultant would be obtained if the teeth extended the entire length of the pinion and but two bearings were employed.

With this construction it will be seen that it is possible for the pinion to move bodily up and down maintaining its axis horizontal, or one end may move up or down without affecting the position of the other end. The pinion with its frame literally floats and it is elastically and yieldingly supported, but with this difference, that either end can move down or up without materially increasing or decreasing the oil pressure at the other end, and without the necessity of the other ends moving a corresponding amount.

If but two bearings are employed for the pinion, it will only be necessary to employ two pistons below and above the floating frame. The same effect exactly will be accomplished as with three. It will be understood that the center piston does not serve as a fulcrum, about which the floating frame pivots, and may be dispensed with if the floating frame is made stiff enough.

In order to prevent undue pounding of the pinion teeth against the gear teeth occasioned by a rolling of the ship where the reduction gearing is used for marine propulsion, adjustable stops 90 secured to the base frame are utilized, and these preferably consist of an adjustable pin 91 which bears against the inner face of the floating frame. These pins are so adjusted that during normal operations and quiet running of the ship, they will not bear hard enough against the floating frame to interfere with its free movement.

In accordance with the provisions of the patent statutes I have described the principle of operation of my invention together with the device which I now consider to represent the best embodiment thereof, but I desire to have it understood that the device shown is only illustrative and that the invention can be carried out in other ways.

Having thus described my invention, what I claim is:

1. The combination with a pair of coöperating gears, one of which is fluid supported, of a bearing for one of said gears, and means for utilizing said bearing as a pump for supplying said fluid.

2. The combination with a pair of coöperating gears, of fluid supporting means for one of said gears, a bearing for one of said gears, and connections whereby said bearing is utilized for pumping the fluid for said supporting means.

3. The combination with a pair of coöperating gears, of a mounting frame for one of said gears, a fluid support for said frame, a bearing in said frame for said gear, and connections whereby said bearing is utilized as a pump for supplying fluid for said support.

4. The combination with a pair of coöperating gears, of a mounting frame for one of said gears, supporting devices for said mounting frame each of which comprises a cylinder and a piston, a bearing in said frame for said gear and connections from said bearing to at least one of said cylinders arranged so that said bearing is caused to supply said cylinder with oil under pressure.

5. The combination with a pair of coöperating gears, of a mounting frame for one of said gears, bearings in said frame for said gear, supporting devices for said frame each of which comprises a cylinder and a piston therein; means for supplying said bearings with oil and connections between said cylinders so arranged that said bearings are caused to force oil under pressure into said cylinders.

6. The combination with a pair of coöperating gears, of a mounting frame for one of said gears, a fluid support for said frame, means for supplying oil under pressure to said support; means for causing the movements of said frame to regulate the escape of oil from said support and means for amplifying the movements of said frame for said regulating device.

7. The combination with a pair of coöperating gears, of a mounting frame for one of said gears, piston chambers within said mounting frame, pistons within said chambers and means for supplying said chambers with oil under pressure for floating said frame.

8. The combination with a pair of coöperating gears, of fluid-supporting means for one of said gears, and an adjustable stop for limiting the movement of one of said gears toward the other.

9. The combination with a pair of coöperating gears, of a mounting frame for one of said gears, a fluid support for said frame, means for supplying said support with fluid under pressure, an outlet device for said support controlled by the movement of said frame, and means for amplifying the movements of said frame for said device.

10. The combination with a pair of intermeshing gears, a floating frame for one of said gears, whereby the axis of one gear may occupy different angular positions with relation to the other gear, means for limiting the relative movement between the gears to a plane substantially vertical to the plane defined by the normal positions of the axes of the gears, and means for limiting the motion of one gear toward the other.

11. In a transmission gearing, a pair of intermeshing gears, fluid supported means for supporting one of said gears, and means dependent on the rotation of the gear supported by said fluid supported means for delivering supporting fluid under pressure to said fluid supported means.

12. In a transmission gearing, a pair of intermeshing gears, fluid supported means for supporting one of said gears, and means actuated by the rotation of the gear supported by the fluid supported means for delivering fluid under pressure to said supporting means.

13. In a transmission gearing, intermeshing gears, a fluid support for one of said gears so that it is movable at an angle to the other gear, and means dependent on the rotation of the gears supported by the fluid supported means for delivering fluid under pressure to the fluid support.

14. In a transmission gearing, intermeshing gears, a fluid support for one of said gears allowing relative angular motion between the gears, means dependent on the rotation of the gears for delivering fluid under pressure to the support, and means dependent on the position of the supported gear, with relation to the other gear, for controlling the amount of supporting pressure.

15. In a transmission gearing, intermeshing gears, a fluid support for one of said gears permitting relative angular motion between the gears, means dependent on the rotation of the gears for delivering the supporting fluid, and means dependent on the relative positions of the axes of the gears for controlling the degree of supporting pressure and for delivering an auxiliary supply of fluid under pressure to the support.

16. In a transmission gearing, intermeshing gears, fluid supported means for one of said gears, means dependent on the rotation of the journal of the gear so supported for delivering fluid to said fluid supported means, and means responsive to variations in tooth pressure between the gears for varying the pressure of the fluid delivered to the supported means.

17. In a transmission gearing, intermeshing gears, fluid supported means for one of said gears, means dependent on the rotation of the journal of the gear supported by said means for delivering fluid to said fluid supported means, means dependent on the tooth pressure between the gears for controlling the degree of pressure delivered, and supplemental means responsive to variations in tooth pressure between the gears for delivering fluid under pressure to said fluid supported means.

18. In a transmission gearing, intermeshing gears, fluid actuated means for supporting one of said gears, a bearing for one of the gears, means for utilizing said bearing as a pump for supplying fluid to said fluid actuated means, and means for varying the effective fluid pressure in response to variations in the tooth pressure between the gears.

19. In a transmission gearing, intermeshing gears, fluid actuated means for supporting one of said gears, a bearing for one of said gears, means for utilizing said bearing as a pump for supplying fluid to said fluid actuated means, means for varying the pressure transmitted to said fluid actuated means in response to variations in the tooth pressure between the gears, and auxiliary means responsive to variations in said pressure for supplementing the fluid delivered to said fluid actuated means by said bearing.

20. In a transmission gearing, intermeshing gears, fluid actuated means for supporting one of said gears so that it can vary its angular position with relation to the other gear, a bearing for one of said gears for supplying fluid under pressure to said fluid actuated means, and means for delivering an auxiliary supply of fluid to said fluid actuated means.

21. In a transmission gearing, intermeshing gears, fluid actuated means for supporting one of said gears so that it can vary its angular position with relation to the other, a bearing for said supported gear so constructed as to deliver fluid under pressure to said fluid actuated means, and means for varying the effective operating pressure of said fluid actuated means so as to counterbalance strains in either direction resulting from tooth pressure between the gears.

22. In a transmission gearing, a pair of intermeshing gears, fluid actuated supporting means for one of said gears, means for supplying fluid under pressure to said supporting means, means responsive to variations in the supported position of said supported gear for controlling the effective pressure of the fluid delivered to the supporting means, and means for amplifying the movements of said supported gear resulting from variations in tooth pressure.

23. In a transmission gearing, a pair of intermeshing gears, fluid actuated means for supporting one of said gears so that the supported gear may move in response to variations in the tooth pressures between the gears, means for limiting the relative motion between the gears to a plane substantially vertical to the plane defined by the normal positions of the axes of the gears, and means for limiting the movement of one of said gears toward the other gear.

24. A transmission gearing comprising intermeshing gears, a floating frame for one of said gears provided with fluid cylinders, pistons coöperating with the cylinders, and a bearing on the frame for the gear supported thereby for delivering fluid under pressure to said cylinders.

25. In a transmission gearing, intermeshing gears, a floating frame on which one of said gears is journaled, cylinders and coöperating fluid actuated pistons for supporting said frame, a bearing for the gear journaled on the frame for delivering fluid under pressure to said cylinders, and means responsive to variations in the tooth pressures between the gears for varying the delivery of fluid from the cylinders.

26. In a transmission gearing, intermeshing gears, a floating frame on which one of said gears is mounted, a set of fluid actuated pistons for supporting said frame, a fluid system for delivering fluid under pressure to each of said pistons, and a bearing for the gear mounted on the frame so constructed as to deliver fluid under pressure to said system.

27. In a transmission gearing, intermeshing gears, a frame on which one of said gears is mounted, a plurality of confined bodies of liquid for supporting said frame, a fluid distributing system communicating with each body of liquid, a bearing for the gear mounted on the frame, and means for utilizing said bearing as a pump for supplying fluid to said distributing system.

28. In a transmission gearing, intermeshing gears, a plurality of confined bodies of liquid for supporting one of said gears, means for confining each body of liquid, a bearing for the supported gear, and means for utilizing said bearing as a pump in supplying pressure to each confined body of liquid.

29. In a transmission gearing, intermeshing gears, a fluid supported frame for one of said gears, means controlled by the movement of the frame for controlling the pressure of the frame supporting fluid, and means for amplifying the movements of the frame in actuating said controlling means.

30. In a transmission gearing, intermeshing gears, a fluid supported frame for one of said gears, means controlled by the movement of the frame for delivering supporting fluid and for controlling the pressure of the fluid delivered, and means for amplifying the motion of the frame in controlling said fluid delivering means.

31. In a transmission gearing, intermeshing gears, a fluid supported frame for one of said gears, movable in response to variations in tooth pressure between the gears, a valve for controlling the delivery of supporting fluid to said frame, an arm mounted on one side of the frame for actuating said valve, and a pivotal connection about which said frame moves located on the opposite side of the frame.

32. In a transmission gearing, intermeshing gears, a fluid supported frame for one of said gears, movable in response to variations in tooth pressure, a stationary base frame on which said movable frame is mounted, a valve for delivering the supporting fluid to said frame, means actuated by the frame for actuating said valve, and a pivotal connection between the movable frame and said base frame about which the frame moves in actuating said valve actuating means.

33. In a transmission gearing, intermeshing gears, a movable frame on which one of said gears is mounted, fluid actuated means for supporting said frame, fluid delivery means for controlling delivery of fluid to said fluid actuated means, fluid discharge means for controlling the discharge of fluid therefrom, an arm mounted on the frame for actuating said fluid delivery and said fluid discharge means, and a pivotal support about which said frame moves located on the opposite side of the frame from the arm.

34. In a transmission gearing, intermeshing gears, a movable frame on which one of said gears is mounted, fluid actuated means for supporting said frame so that it is movable in response to variations in tooth pressures between the gears, means for delivering fluid to said fluid actuated means and for controlling the pressure of the fluid delivered, means connected to the frame for actuating said fluid delivery, and pressure controlling means in response to variations in the position of the frame, and a link pivotally connected to said frame for limiting the motion of said frame, and for thereby amplifying the motion of the actuating means.

35. In a transmission gearing, intermeshing gears, a frame on which one of said gears is journaled, fluid actuated means for supporting said frame, a bearing for the gear on the frame for delivering fluid to said means, means responsive to variations in the position of the frame for controlling the pressure of the fluid delivered, means for delivering fluid from an auxiliary source of fluid supply to said supporting means, and means controlled by movements of the frame in response to variations in tooth pressure for controlling the delivery of fluid from said auxiliary source to said supporting means.

36. In a transmission gearing, intermeshing gears, a frame on which one of said gears is journaled, fluid actuated means for supporting said frame, a bearing for one of the gears for delivering fluid pressure to said means, a valve between said bearing and said means for varying the operating pressure in said means in response to variations in the position of said frame due to variations in tooth pressure between the gears, an auxiliary source of fluid supply, and means responsive to variations in the position of the frame for delivering fluid from said auxiliary source to said supporting means after said bearing is incapable of supplying sufficient fluid pressure to counterbalance the strains due to tooth pressure.

37. In a transmission gearing, intermeshing gears, a floating frame on which one of said gears is mounted, fluid actuated supporting means for said frame, fluid delivery means for controlling the operation of said supporting means in response to variations in the position of said frame, and means for amplifying the motion of the frame and for actuating said fluid delivery means.

38. In a transmission gearing, intermeshing gears, a floating frame on which one of said gears is mounted constructed so that the supported gear can move in response to variations in tooth pressure and vary its angular position with relation to the axis of the other gear, a link pivotally secured to said frame for limiting the motion of the frame, and adjustable stops for limiting the movement of the movably supported gear toward the other gear.

39. In a transmission gearing, intermeshing gears, a floating frame on which one of said gears is mounted and constructed so that the gear mounted thereon is movable in response to variations in tooth pressure, struts for limiting the motion of the movably supported gear to a plane substantially at right angles to the plane defined by the normal positions of the axes of the gears, and a link to which said frame is pivotally connected for limiting the motion thereof.

40. In a transmission gearing, intermeshing gears, a pivotally mounted floating frame, fluid actuated means for supporting said frame so that it is capable of moving about its pivotal point in response to variations in tooth pressure between the gears.

41. In a transmission gearing, intermeshing gears, a floating frame on which one of said gears is mounted, oppositely disposed and oppositely operating hydraulic supporting means for said frame, a bearing for the frame supported gear constructed so as to operate as a pump and to deliver liquid under pressure, means for delivering liquid from the bearing to said supporting means, and means responsive to the movement of the frame for controlling the liquid pressure on said pistons and for thereby counterbalancing the forces in either direction occasioned by the tooth pressure between the gears.

42. In a transmission gearing, intermeshing gears, two oppositely located liquid pressure actuated devices between which one of said gears is mounted, said devices being constructed and arranged to allow relative angular motion between said gears, a bearing for the supported gear so constructed as to deliver liquid under pressure, connections from said bearing to the devices, and means for varying the effective operating liquid pressure transmitted to each device and for thereby counterbalancing strains in either direction occasioned by tooth pressure.

43. In a transmission gearing, intermeshing gears, a frame on which one of said gears is journaled provided with oppositely located and oppositely operating cylinders, supporting pistons for the frame coöperating with said cylinders, a bearing for the frame supported gear so constructed that it is capable of operating as a pump, connections between said bearing and said cylinders, and means actuated by variations in the positions of the frame for controlling the liquid pressure within the cylinders and for thereby counterbalancing in either direction the strains due to tooth pressure between the gears.

In testimony whereof, I have hereunto subscribed my name this 13th day of June, 1911.

GEO. WESTINGHOUSE.

Witnesses:
C. W. McGHEE,
R. J. RIDGE.